US010616200B2

(12) United States Patent
Kumar et al.

(10) Patent No.: US 10,616,200 B2
(45) Date of Patent: Apr. 7, 2020

(54) METHODS, SYSTEMS, AND COMPUTER READABLE MEDIA FOR MOBILITY MANAGEMENT ENTITY (MME) AUTHENTICATION FOR OUTBOUND ROAMING SUBSCRIBERS USING DIAMETER EDGE AGENT (DEA)

(71) Applicant: Oracle International Corporation, Redwood Shores, CA (US)

(72) Inventors: Vipin Kumar, Bangalore (IN); Shashikiran Bhalachandra Mahalank, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 139 days.

(21) Appl. No.: 15/666,300

(22) Filed: Aug. 1, 2017

(65) Prior Publication Data
US 2019/0044932 A1 Feb. 7, 2019

(51) Int. Cl.
*G06F 21/00* (2013.01)
*H04L 29/06* (2006.01)
(Continued)

(52) U.S. Cl.
CPC .............. *H04L 63/08* (2013.01); *G06F 16/22* (2019.01); *H04L 63/0892* (2013.01);
(Continued)

(58) Field of Classification Search
CPC .............. H04L 63/08; H04L 63/0892; H04W 12/1201; H04W 8/02; H04W 8/18;
(Continued)

(56) References Cited

U.S. PATENT DOCUMENTS 6,091,958 A 7/2000 Bergkvist et al.
6,308,075 B1 10/2001 Irten et al.
(Continued)

FOREIGN PATENT DOCUMENTS

CN 107 800 664 A 3/2018
EP 1 067 492 A2 1/2001
(Continued)

OTHER PUBLICATIONS

Examiner's Answer for U.S. Appl. No. 13/047,287 (dated Feb. 26, 2018).
(Continued)

*Primary Examiner* — Alexander Lagor
*Assistant Examiner* — Rodman Alexander Mahmoudi
(74) *Attorney, Agent, or Firm* — Jenkins, Wilson, Taylor & Hunt, P.A.

(57) ABSTRACT

A method for authenticating a mobility management entity (MME) for outbound roaming subscribers includes maintaining a Diameter authentication information request (AIR)/update location request (ULR) mapping database at a Diameter edge agent (DEA). A Diameter AIR message is received at the DEA. The DEA determines that the AIR message includes a visited public land mobile network identifier (VPLMN ID) not of record in the database. The DEA records the VPLMN ID in the database. A Diameter ULR message is received at the DEA, and a VPLMN ID is read from the ULR message. The DEA determines that the VPLMN ID read from the ULR message does not match the VPLMN ID recorded for the subscriber in the database. In response to determining that the VPLMN ID does not match the VPLMN ID recorded for the subscriber in the database, the DEA rejects the ULR message.

18 Claims, 8 Drawing Sheets

(51) Int. Cl.
*H04W 12/12* (2009.01)
*G06F 16/22* (2019.01)
*H04W 8/02* (2009.01)
*H04W 8/18* (2009.01)
*H04W 12/06* (2009.01)
*H04W 8/12* (2009.01)
*H04W 84/04* (2009.01)

(52) U.S. Cl.
CPC ............... *H04W 8/02* (2013.01); *H04W 8/18* (2013.01); *H04W 12/06* (2013.01); *H04W 12/12* (2013.01); *H04W 12/1201* (2019.01); *H04W 8/12* (2013.01); *H04W 84/042* (2013.01)

(58) Field of Classification Search
CPC ....... H04W 12/06; H04W 12/12; H04W 8/12; H04W 84/042
See application file for complete search history.

(56) References Cited

U.S. PATENT DOCUMENTS

| | | | |
|---|---|---|---|
| 7,043,754 | B2 | 5/2006 | Arnouse |
| 8,045,956 | B2 | 10/2011 | Sun et al. |
| 8,615,217 | B2 | 12/2013 | Ravishankar et al. |
| 8,879,431 | B2 | 11/2014 | Ridel et al. |
| 9,060,263 | B1 | 6/2015 | Carames et al. |
| 9,191,803 | B2 | 11/2015 | Patel et al. |
| 9,240,946 | B2 | 1/2016 | Cai et al. |
| 9,374,840 | B2 | 6/2016 | Monedero Recuero |
| 9,538,335 | B1 | 1/2017 | Bank et al. |
| 9,628,994 | B1 | 4/2017 | Gunyel et al. |
| 10,021,738 | B1 | 7/2018 | Mehta et al. |
| 10,212,538 | B2 | 2/2019 | Russell |
| 10,237,721 | B2 | 3/2019 | Gupta et al. |
| 10,306,459 | B1 | 5/2019 | Patil et al. |
| 10,470,154 | B2 | 11/2019 | Chellamani et al. |
| 2001/0046856 | A1 | 11/2001 | McCann |
| 2002/0098856 | A1 | 7/2002 | Berg et al. |
| 2002/0181448 | A1 | 12/2002 | Uskela et al. |
| 2002/0193127 | A1 | 12/2002 | Martschitsch |
| 2003/0087647 | A1 | 5/2003 | Hurst |
| 2004/0140908 | A1 | 7/2004 | Gladwin et al. |
| 2005/0182968 | A1 | 8/2005 | Izatt et al. |
| 2005/0232236 | A1 | 10/2005 | Allison et al. |
| 2006/0068762 | A1 | 3/2006 | Baldwin et al. |
| 2006/0193258 | A1 | 8/2006 | Ballai |
| 2006/0211406 | A1 | 9/2006 | Szucs et al. |
| 2006/0242414 | A1 | 10/2006 | Corson et al. |
| 2007/0011261 | A1 | 1/2007 | Madams et al. |
| 2007/0174082 | A1 | 7/2007 | Singh |
| 2007/0281718 | A1 | 12/2007 | Nooren |
| 2008/0004047 | A1 | 1/2008 | Hill et al. |
| 2008/0026778 | A1 | 1/2008 | Cai et al. |
| 2008/0045246 | A1 | 2/2008 | Murtagh et al. |
| 2008/0125116 | A1 | 5/2008 | Jiang |
| 2008/0207181 | A1 | 8/2008 | Jiang |
| 2008/0222038 | A1 | 9/2008 | Eden |
| 2009/0045251 | A1 | 2/2009 | Jaiswal et al. |
| 2009/0195349 | A1 | 8/2009 | Frader-Thompson et al. |
| 2010/0062789 | A1 | 3/2010 | Agarwal et al. |
| 2010/0100958 | A1 | 4/2010 | Jeremiah |
| 2010/0105355 | A1 | 4/2010 | Nooren |
| 2010/0130227 | A1 | 5/2010 | Farthofer et al. |
| 2010/0161817 | A1 | 6/2010 | Xiao et al. |
| 2010/0223222 | A1* | 9/2010 | Zhou ...................... H04L 12/14 706/47 |
| 2010/0235911 | A1 | 9/2010 | Nooren |
| 2010/0240361 | A1 | 9/2010 | Jiang |
| 2010/0313024 | A1 | 12/2010 | Weniger et al. |
| 2011/0029655 | A1 | 2/2011 | Forbes, Jr. et al. |
| 2011/0063126 | A1 | 3/2011 | Kennedy et al. |
| 2011/0124317 | A1 | 5/2011 | Joo |
| 2011/0173122 | A1 | 7/2011 | Singhal |
| 2011/0191835 | A1 | 8/2011 | Hawkes et al. |
| 2011/0217979 | A1 | 9/2011 | Nas |
| 2011/0225091 | A1 | 9/2011 | Plastina et al. |
| 2011/0307381 | A1 | 12/2011 | Kim et al. |
| 2012/0099715 | A1 | 4/2012 | Ravishankar et al. |
| 2012/0131121 | A1 | 5/2012 | Snyder et al. |
| 2012/0203663 | A1 | 8/2012 | Sinclair et al. |
| 2012/0207015 | A1* | 8/2012 | Marsico .............. H04L 41/0663 370/221 |
| 2013/0171988 | A1 | 7/2013 | Yeung et al. |
| 2013/0331063 | A1* | 12/2013 | Cormier .............. H04L 63/0272 455/411 |
| 2014/0199961 | A1 | 7/2014 | Mohammed et al. |
| 2014/0280645 | A1 | 9/2014 | Shuman et al. |
| 2014/0378129 | A1 | 12/2014 | Jiang et al. |
| 2015/0012415 | A1 | 1/2015 | Livne et al. |
| 2015/0188979 | A1 | 7/2015 | Almeras et al. |
| 2016/0088461 | A1 | 3/2016 | Jiang |
| 2016/0156647 | A1 | 6/2016 | Engel et al. |
| 2016/0165432 | A1 | 6/2016 | Dubesset et al. |
| 2016/0269566 | A1 | 9/2016 | Gundamaraju et al. |
| 2016/0292687 | A1 | 10/2016 | Kruglick |
| 2017/0345006 | A1 | 11/2017 | Kohli |
| 2018/0020324 | A1 | 1/2018 | Beauford |
| 2018/0109953 | A1 | 4/2018 | He |
| 2018/0167906 | A1 | 6/2018 | Chellamani et al. |
| 2018/0205698 | A1 | 7/2018 | Gupta et al. |
| 2018/0310162 | A1 | 10/2018 | Kim et al. |
| 2019/0007788 | A1 | 1/2019 | Russell |
| 2020/0007538 | A1 | 1/2020 | Mehta |
| 2020/0053044 | A1 | 2/2020 | Mahalank et al. |

FOREIGN PATENT DOCUMENTS

| | | |
|---|---|---|
| EP | 1 906 682 A1 | 4/2008 |
| EP | 3 493 569 A1 | 6/2019 |
| WO | WO 2005/091656 A1 | 9/2005 |
| WO | WO 2005/101872 A1 | 10/2005 |
| WO | WO 2007/084503 A2 | 7/2007 |
| WO | WO 2010/045646 A2 | 4/2010 |
| WO | WO 2010/105099 A2 | 9/2010 |
| WO | WO 2019/005287 A1 | 1/2019 |
| WO | WO 2020/005374 A1 | 1/2020 |
| WO | WO 2020/013889 A1 | 1/2020 |
| WO | WO 2020/033113 A1 | 2/2020 |

OTHER PUBLICATIONS

Advisory Action Before the Filing of an Appeal Brief and AFCP 2.0 Decision for U.S. Appl. No. 15/376,631 (dated Feb. 2, 2018).

"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).

Notice of Allowance and Fee(s) Due for U.S. Appl. No. 15/636,118 (dated Apr. 27, 2018).

Non-Final Office Action for U.S. Appl. No. 15/376,631 (dated Apr. 18, 2018).

Notification of Transmittal of the International Search Report and the Written Opinion of the International Searching Authority, or the Declaration for International Application No. PCT/US2018/030319 (dated Aug. 20, 2018).

Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).

Final Office Action for U.S. Appl. No. 15/408,155 (dated Jul. 26, 2018).

Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)", (Unpublished, filed Jul. 13, 2018).

Commonly-assigned, co-pending U.S. Appl. No. 16/024,422 for "Methods, Systems, and Computer Readable Media for Network Node Validation," (Unpublished, filed Jun. 29, 2018).

(56) References Cited

OTHER PUBLICATIONS

"Draft LS on network verification of UE provided location, " 3GPP TSG SA WG2 Meeting #81, p. 1 (Oct. 11-15, 2010).
Notice of Allowance and Fee(s) Due for U.S. Appl. No. 16/035,008 (dated Jan. 18, 2019).
Advisory Action Before the Filing of an Appeal Brief and AFCP 2.0 Decision for U.S. Appl. No. 15/376,631 (dated Dec. 19, 2018).
Notice of Allowance and Fee(s) Due and Applicant-Initiated Interview Summary for U.S. Appl. No. 15/408,155 (dated Oct. 31, 2018).
Notification of Transmittal of the International Search Report and the Written Opinion of the International Searching Authority, or the Declaration for International Patent Application No. PCT/US2018/043985 (dated Oct. 9, 2018).
Final Office Action for U.S. Appl. No. 15/376,631 (dated Oct. 5, 2018).
Notice of Allowance and Fee(s) Due for U.S. Appl. No. 15/636,118 (dated Oct. 3, 2018).
Non-Final Office Action for U.S. Appl. No. 15/408,155 (dated Jan. 9, 2018).
Final Office Action for U.S. Appl. No. 15/376,631 (dated Nov. 28, 2017).
Commonly-assigned, co-pending U.S. Appl. No. 15/636,118 for "Methods, Systems, and Computer Readable Media for Validating User Equipment (UE) Location," (Unpublished, filed Jun. 28, 2017).
Non-Final Office Action for U.S. Appl. No. 15/376,631 (dated Jun. 16, 2017).
"LTE International Roaming Whitepaper," http://carrier.huawei.com/en/technical-topics/core-network/lte-roaming-whitepaper, pp. 1-16 (Downloaded May 12, 2017).
"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).
Final Office Action for U.S. Appl. No. 13/047,287 (dated Mar. 10, 2017).
Commonly-assigned, co-pending U.S. Appl. No. 15/408,155 for "Methods, Systems, and Computer Readable Media for Validating a Redirect Address in a Diameter Message," (Unpublished, filed Jan. 17, 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Commonly-assigned, co-pending U.S. Appl. No. 15/376,631 for "Methods, Systems, and Computer Readable Media for Validating Subscriber Location Information," (Unpublished, filed Dec. 12, 2016).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1- 11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).

Kotte, "Analysis and Experimental Verification of Diameter Attacks in Long Term Evolution Networks," http://www.diva-portal.org/smash/get/diva2.951619/FULLTEXT01.pdf, pp. 1-72 (2016).
Advisory Action Before the Filing of an Appeal Brief for U.S. Appl. No. 13/047,287 (dated Oct. 16, 2015).
"The Dialogic® Helix™ Signaling Controller," https://www.dialogic.com/-/media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9)," ETSI TS 129 172, V9.6.0, pp. 1-27 (Apr. 2015).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Mobile Telecommunications System (UMTS); LTE; Location Services (LCS); Service description; Stage 1 (3GPP TS 22.071 V 11.0.0 Release 11)," ETSI TS 122 071 V11.0.0, pp. 1-50 (Oct. 2012).
Restriction and/or Election Requirement for U.S. Appl. No. 12/823,559 (dated Aug. 27, 2012).
Non-Final Office Action for U.S. Appl. No. 13/047,287 (dated Jun. 6, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"NET-NET Diameter Director," http://www.oracle.com/us/industries/communications/net-net-diameter-director-ds-1985034.pdf, pp. 1-9 (Copyright 2012).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Press Release, "SmartSynch SmartMeters Communicate Using the Largest and Most Available Wireless Networks in the World," http://www.smartsynch.com/SmartSynch_gprs,htm, pp. 1-2 (Downloaded from the Internet on Jul. 5, 2011).
"Solution: Itron Centron GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/EDG Gateway for Smart Metering Introduced," Metering.com, http://www.metering.com/node/13550 Sep. 19, 2008, pp. 1-2 (Downloaded from the Internet on Jul. 5, 2011).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009.)
"3rd Generation Partnership Project; Technical Specification Group Core Network and Terminals; Evolved Packet System (EPS); Mobility Management Entity (MME) and Serving GPRS Support Node

(56) References Cited

OTHER PUBLICATIONS (SGSN) related interfaces based on Diameter protocol (Release 8)," 3GPP TS 29.272, V8.1.1, pp. 1-57 (Jan. 2009).

"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0, pp. 1-42 (Nov. 2008).

Hakala et al., "Diameter Credit-Control Application," RFC 4006, pp. 1-115 (Aug. 2005).

Applicant-Initiated Interview Summary for U.S. Appl. No. 16/100,172 (dated Jul. 18, 2019).

Notice of Allowance and Fee(s) Due and Examiner-Initiated Interview Summary for U.S. Appl. No. 15/376,631 (dated Jul. 2, 2019).

Decision on Appeal for U.S. Appl. No. 13/047,287 (dated Jun. 18, 2019).

Notification of Transmittal of the International Search Report and the Written Opinion of the International Searching Authority, or the Declaration for International Patent Application No. PCT/US2019/018990 (dated May 8, 2019).

Non-Final Office Action for U.S. Appl. No. 16/100,172 (dated Apr. 11, 2019).

Notification of Transmittal of the International Search Report and the Written Opinion of the International Searching Authority, or the Declaration for International Application Serial No. PCT/US2019/028814 (dated Aug. 20, 2019).

Notice of Allowance and Fee(s) due for U.S. Appl. No. 12/581,739 (dated Aug. 8, 2012).

Notice of Allowance and Fee(s) Due and Examiner-Initiated Interview Summary for U.S. Appl. No. 12/581,739 (dated May 15, 2012).

Non-Final Office Action for U.S. Appl. No. 12/722,460 (dated Apr. 9, 2012).

Final Office Action for U.S. Appl. No. 12/581,739 (dated Dec. 30, 2011).

Non-Final Office Action for U.S. Appl. No. 12/581,739 (dated Aug. 26, 2011).

Notification of Transmittal of the International Search Report and the Written Opinion of the International Searching Authority, or the Declaration for International Application No. PCT/US2010/027043 (dated Oct. 19, 2010).

Notification of Transmittal of the International Search Report and the Written Opinion of the International Searching Authority, or the Declaration for International Application No. PCT/US2009/061187 (dated May 17, 2010).

"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).

"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).

3rd Generation Partnership Project "Technical Specification Group Core Network and Terminals; Study into routeing of MT-SMs via the HPLMN (Release 7)," 3GPP TR 23.840 V7.1.0 (Mar. 2007).

Final Office Action for U.S. Appl. No. 16/100,172 (dated Oct. 3, 2019).

Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).

Advisory Action and Applicant-Initiated Interview Summary for U.S. Appl. No. 16/100,172 (dated Dec. 20, 2019).

Notification of Transmittal of the International Search Report and the Written Opinion of the International Searching Authority, or the Declaration for International Application Serial No. PCT/US2019/042203 (dated Nov. 11, 2019).

"Technical Specification Group Core Network and Terminals; Evolved Packet System (EPS); Mobility Management Entity (MME) and serving GPRS Support Node (SGSN) related interfaces based on Diameter protocol (Release 16)," 3GPP TS 29.272, V16.0.0, pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).

"Technical Specification Group Core Network and Terminals; Mobile Application Part (MAP) specification (Release 15)," 3GPP TS 29.002, V15.5.0, pp. 1-1024 (Jun. 2019).

Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).

\* cited by examiner

METHODS, SYSTEMS, AND COMPUTER READABLE MEDIA FOR MOBILITY MANAGEMENT ENTITY (MME) AUTHENTICATION FOR OUTBOUND ROAMING SUBSCRIBERS USING DIAMETER EDGE AGENT (DEA)

TECHNICAL FIELD

The subject matter described herein relates to fraud prevention in mobile communications networks. More particularly, the subject matter described herein relates to methods, systems, and computer readable media for MME authentication for outbound roaming subscribers using a DEA.

BACKGROUND

Mobile communications networks are expanding and utilize multiple technologies and interconnects to carry signaling messages used to establish communications over the networks. Home network elements of a core network are typically not connected to foreign or visited networks. Instead, interconnect networks are used to forward signaling between the home network and other networks. This makes the home networks susceptible to Diameter security attacks, which can be introduced through a compromised remote foreign network.

Different types of Diameter security attacks can be introduced into an operator's home network through an interconnect network. Such attacks may be introduced through interconnect signaling traffic from roaming networks. Some examples of attacks are subscriber denial of service (DoS) attacks, location tracking attacks, and fraud attacks. These attacks may be effected by spoofing or impersonating the identity of foreign network elements. For example, identifiers for a serving MME and home subscriber server (HSS) may be spoofed in incoming messages. In one example, an attacker can send Diameter update location request messages to the home HSS of the subscriber. A spoofed update location request message may include a fake MME that is different from the MME where a user equipment (UE) is currently registered. The HSS may respond to the spoofed update location request message with and update location answer message including subscription information that is delivered to the attacker instead of a valid MME. In addition, the HSS updates the subscriber's location to point to the attacker so that communications intended for the subscriber are first sent to the attacker, which acts as a "man in the middle" eavesdropping on communications involving the subscriber while relaying the communications to and from the subscriber.

Accordingly, there exists a need for methods, systems, and computer readable media for MME authentication for outbound roaming subscribers using a DEA.

SUMMARY

The subject matter described herein includes a methods, systems, and computer readable media for MME authentication for outbound roaming subscribers. One method includes maintaining a Diameter authentication information request/update location request (AIR/ULR) mapping database at a DEA. The method further includes receiving, at the DEA, a Diameter AIR message. The method further includes determining, by the DEA, that the Diameter AIR message includes a visited public land mobile network identifier (VPLMN ID) not of record in the AIR/ULR mapping database at the DEA. The method further includes recording the VPLMN ID in the Diameter AIR/ULR mapping database at the DEA. The method further includes receiving, at the DEA, a first Diameter ULR message and reading a VPLMN ID in the first Diameter ULR message. The method further includes determining that the VPLMN ID read from the first ULR does not match the VPLMN ID recorded for the subscriber in the Diameter AIR/ULR mapping database at the DEA. The method further includes in response to determining that the VPLMN ID does not match the VPLMN ID recorded for the subscriber in the Diameter AIR/ULR mapping database at the DEA, rejecting the first Diameter ULR message.

In one exemplary implementation, the DEA comprises a Diameter routing agent (DRA) for functioning at an edge of a home network for the subscriber. A Diameter routing agent is a node that is configured to route Diameter signaling messages based on Diameter level information in the signaling messages.

In one example, receiving the Diameter AIR message includes receiving the Diameter AIR message with an IMSI that is not of record in the Diameter AIR/ULR mapping database at the DEA and recording the VPLMN ID from the AIR message in the database at the DEA includes creating a new record in the Diameter AIR/ULR mapping database at the DEA for the IMSI and the VPLMN ID.

In one example, receiving a Diameter AIR message includes receiving a Diameter AIR message including an IMSI that is of record in the Diameter AIR/ULR mapping database at the DEA and recording the VPLMN ID from the AIR message in the Diameter AIR/ULR mapping database at the DEA includes creating, in the Diameter AIR/ULR mapping database at the DEA, a new record corresponding to the IMSI and storing the VPLMN ID from the Diameter AIR message in the record.

In one example, the DEA forwards the received AIR message to a home subscriber server (HSS), receives a Diameter-authentication information answer (AIA) message with a successful 2xxx result code from the HSS, and starts a record expiry timer in response to receiving the AIA message from the HSS. In response to the record expiry timer reaching an expiration value, the DEA deletes the record from the Diameter AIR/ULR mapping database at the DEA.

In one example, the DEA receives a second Diameter ULR message including a VPLMN ID that matches the VPLMN ID of record for the subscriber in the Diameter AIR/ULR mapping database. The DEA forwards the second Diameter ULR message to an HSS and updates the record in the Diameter AIR/ULR mapping database at the DEA to indicate receipt of the second ULR message.

In one example, in response to determining that the VPLMN ID in the first ULR message does not match the VPLMN ID of record for the subscriber in the Diameter AIR/ULR mapping database, the DEA marks the ULR message as suspicious.

A system for MME authentication for outbound roaming subscribers includes a DEA having at least one processor. The DEA further includes a Diameter AIR/ULR mapping database local to the DEA for storing records for authenticating MMEs. The system includes an MME authentication application local to the DEA and implemented using the at least one processor for receiving a Diameter AIR message, determining that the Diameter AIR message includes a visited public land mobile network identifier (VPLMN ID) not of record, recording the VPLMN ID in the AIR/ULR mapping database at the DEA, receiving a first Diameter ULR message and reading a VPLMN ID in the first Diameter ULR message, determining that the VPLMN ID read from the first ULR message does not match the VPLMN ID recorded for the subscriber in the Diameter AIR/ULR mapping database at the DEA, and, in response to determining that the VPLMN ID does not match the VPLMN ID recorded for the subscriber in the Diameter AIR/ULR mapping database at the DEA, rejecting the first Diameter ULR message.

In one example, the DEA comprises a DRA for functioning at an edge of a home network for the subscriber.

In one example, the MME authentication application is configured to receive the Diameter AIR message with an IMSI that is not of record in the Diameter AIR/ULR mapping database at the DEA and to create a new record in the Diameter AIR/ULR mapping database at the DEA for the IMSI and the VPLMN ID.

In one example, the MME authentication application is configured to receive the Diameter AIR message including an IMSI that is of record in the Diameter AIR/ULR mapping database at the DEA and to create, in the AIR/ULR mapping database at the DEA, a new record corresponding to the IMSI and store the VPLMN ID in the Diameter AIR message in the new record.

In one example, the MME authentication application is configured to forward the AIR message to an HSS, receive a Diameter authentication information answer (AIA) message with a successful 2xxx result code from the HSS, and start a record expiry timer in response to receiving the AIA message from the HSS. The MME authentication application is configured to, in response to the record expiry timer reaching an expiration value, delete the record from the database at the DEA.

In one example, the MME authentication application is configured to receive a second Diameter ULR message including a VPLMN ID that matches the VPLMN ID of record for the subscriber and to forward the second Diameter ULR message to a home subscriber server (HSS). The MME authentication application is configured to update the record in the database at the DEA to indicate receipt of the second ULR message.

In one example, the MME authentication application is configured to, in response to determining that the VPLMN ID in the first ULR message does not match the VPLMN ID of record, mark the first ULR message as suspicious.

The following terminology is used to describe the subject matter described herein for authenticating MME for outbound roaming subscribers:

Outbound roaming subscribers: home subscribers roaming in a visited network.

Home network: a network where operated by a mobile operator with which a subscriber subscription agreement.

Visited network: a network in which a subscriber is roaming.

Diameter edge agent (DEA): a Diameter routing agent (DRA) sitting at the edge of a network and through which roaming Diameter traffic from a foreign network or home network Diameter traffic towards the foreign network passes.

Update location request (ULR): Diameter message used to update the location of a subscriber in an HSS.

Authentication information request (AIR): Diameter message used to authenticate the subscriber using HSS information.

Cancel location request: Diameter message used to indicate that the HSS has new MME information (location information), and the old information should be removed.

International mobile subscriber identity (IMSI): unique identity of a subscriber.

Denial of service (DoS): a type of security attack against a network which prevents legitimate users from accessing services.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
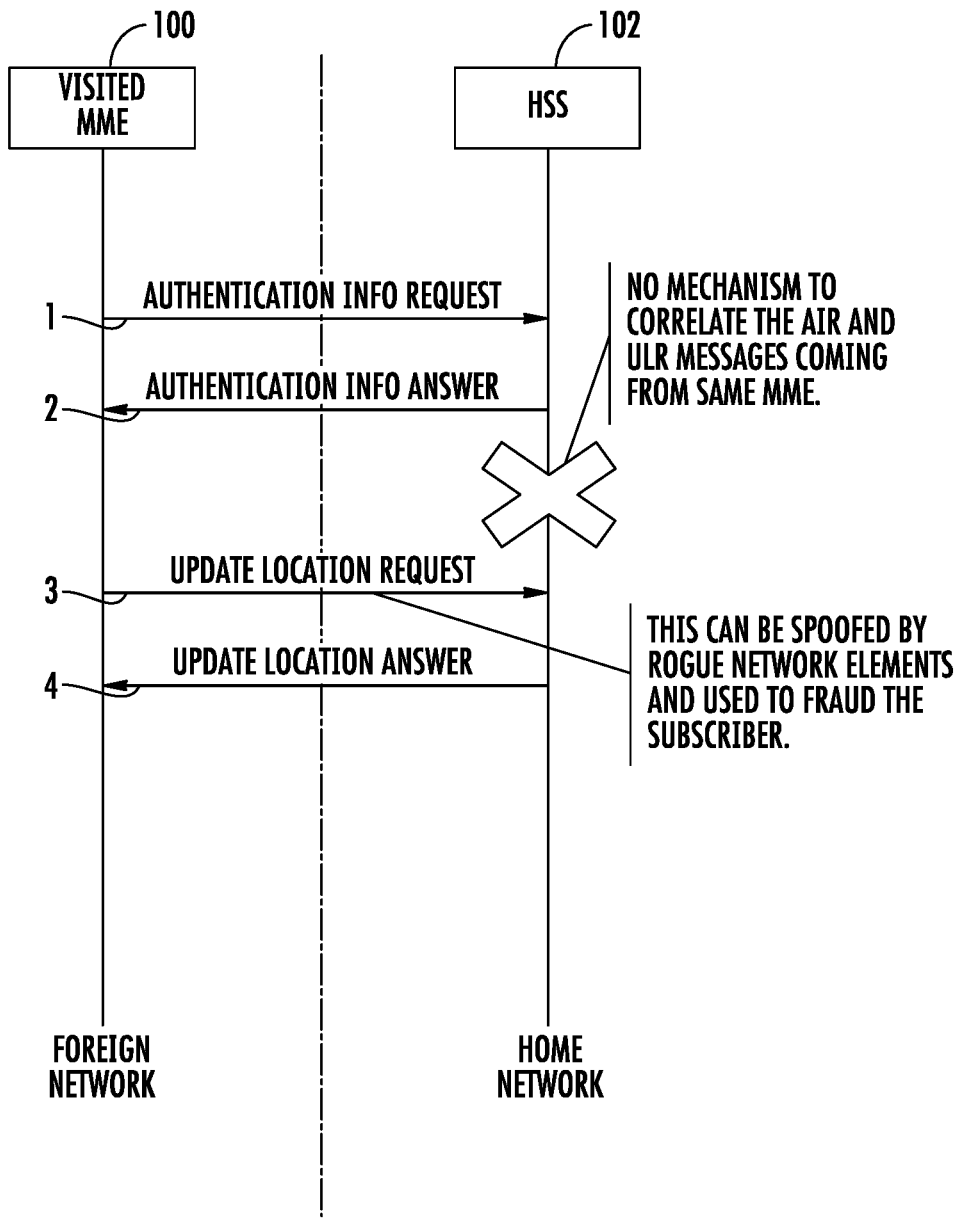
FIG. 1 is a message flow diagram illustrating exemplary messages exchanged between network entities for an outbound roaming scenario.

Methods, systems, and computer readable media for MME authentication for outbound roaming subscribers using a Diameter edge agent are disclosed. FIG. 1 is a message flow diagram illustrating exemplary messages that may be exchanged in a mobile communications network for an outbound roaming scenario. In FIG. 1, it is assumed that a subscriber is in a visited network without home network radio access. Accordingly, the subscriber may be registered with a visited MME 100, which may update a home HSS 102 with the subscriber's current location. Prior to updating HSS 102 with subscriber's current location, in line 1 of the message flow diagram, visited MME 100 sends a Diameter authentication information request to HSS 102. The authentication information request identifies the visited MME and the subscriber. HSS 102 responds with a Diameter authentication information answer message.

After receiving the authentication information answer message, in line 3 of the message flow diagram, visited MME 100 sends a Diameter update location request to HSS 102 to update the subscriber's location. In response to the update location request, HSS 102 sends an update location answer message to visited MME 100 with subscription information for the subscriber. The subscription information allows services to be provided to the user and charging according to the visited network in which the subscriber is roaming.

When a valid subscriber is roaming in a foreign network and the Diameter update location request message originates from a valid MME, the scenario illustrated in FIG. 1 does not involve any fraud. However, a fraudulent system hosted by an attacker can act as visited MME 100 and send a spoofed ULR message to HSS 102 to update the location data stored for the subscriber to point to the attacker's network. The updating of the subscriber's location information with the HSS can allow the attacker to intercept subsequent communications involving the subscriber, because the record in the HSS would point to the location of the attacker, rather than the actual location of the subscriber. What is needed is an efficient mechanism to verify that the AIR and the ULR are coming from the same visited MME.

One exemplary solution described herein to reduce the likelihood of fraudulent scenarios involving Diameter signaling messages is to provide a Diameter edge agent to receive incoming messages from foreign networks and perform screening and authentication processing for Diameter signaling messages that include MME identities. The DEA acts as a gatekeeper for roaming Diameter traffic into and leaving the home network. The DEA may validate the MME identity of the visited network for the AIR/ULR messages received in the home network. Such validation may involve:
1. Ensuring that the ULR only follows an AIR when a subscriber moves from one roaming network to another roaming network.
2. Verifying that the AIR and ULR come from the same MME within a stipulated time.

The DEA may be used to maintain a mapping of IMSI and <VPLMN ID, AIR flag, ULR flag, MME Identifier> information of the visited network MME in a database, referred to herein as the AIR/ULR mapping database. The IMSI identifies the mobile subscriber. The VPLMN ID carries a mobile country code (MCC) and a mobile network code (MNC), which identify the visited network. The VPLMN ID is carried in both AIR and ULR messages. The AIR flag is set when an AIR message is received for a particular IMSI. The ULR flag is sent when a ULR is received for the IMSI. The MME identifier identifies the visited network's MME. The MME Identifier is updated on receiving the ULR message from visited network MME.

The ULR may be validated if the ULR is received only after successful authentication via AIR messages with the same MME. Messages may be forwarded to the HSS or MME for valid scenarios (i.e., scenarios when the VPLMN ID matches). The DEA may also maintain a record expiry timer for deleting records from its local database. The default expiry timeout could be for the record may be set to an operator-defined value, such as 21,600 seconds or 6 hours. When the timer expires, the record may be deleted from the AIR/ULR mapping database.

Figure 2:
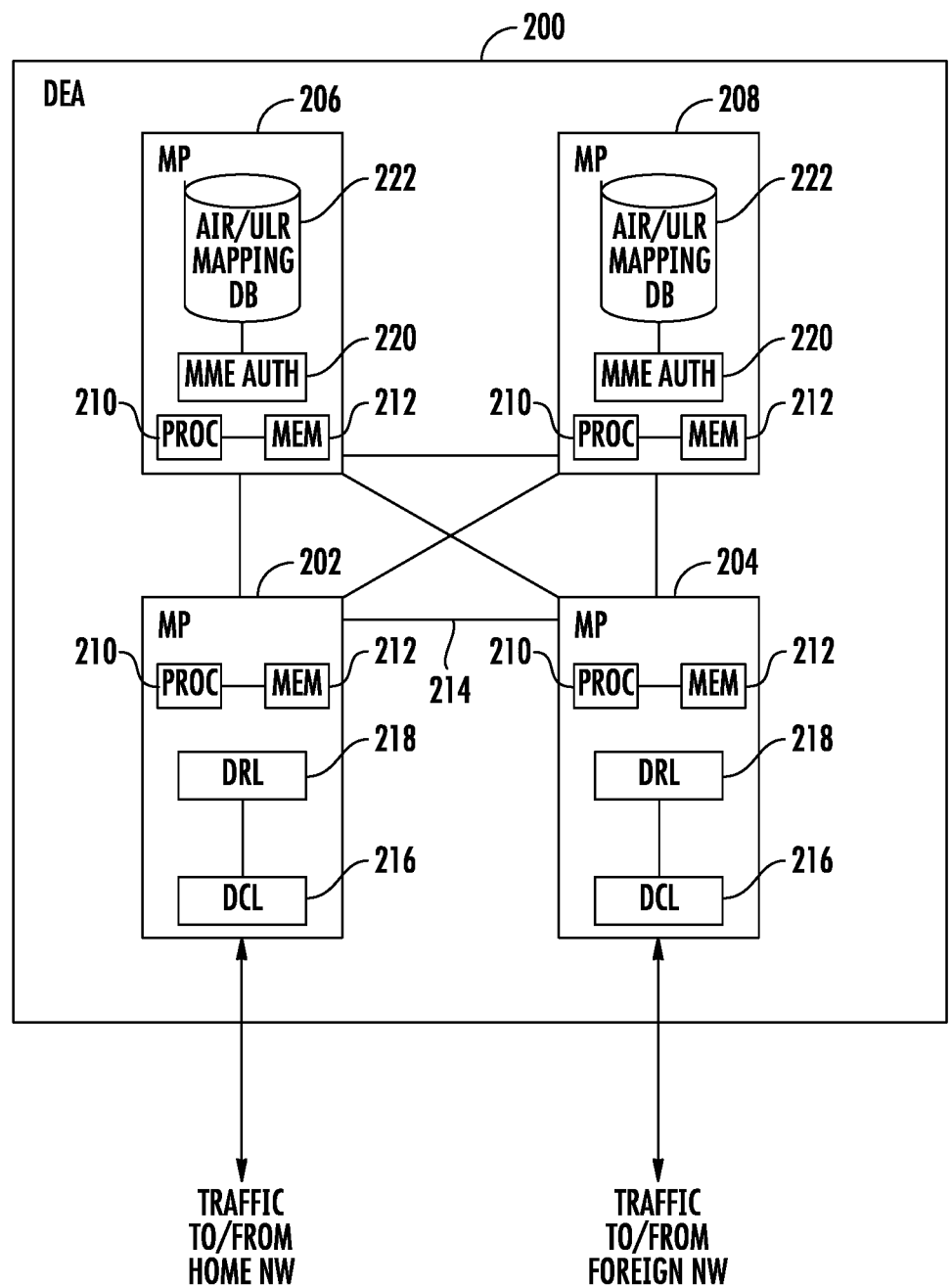
FIG. 2 is a block diagram illustrating a DEA for performing MME authentication to reduce fraud in update location transactions according to an embodiment of the subject matter described herein.

FIG. 2 is a block diagram illustrating an exemplary DEA 200 suitable for performing MME authentication for outbound roaming subscribers. Such a DEA may be located at the edge of an operator's home network to screen Diameter signaling message traffic received from networks external to the home network. In addition, the DEA may maintain a limited amount of state information for transactions involving MME authentication so that the identity of the MME in signaling message traffic can be verified or identified as fraudulent.

Referring to FIG. 2, DEA 200 includes a plurality of message processors 202, 204, 206, and 208 connected via one or more interconnects 214. Each message processor 202, 204, 206, and 208 may include a printed circuit board, such as a blade configured for insertion in a shelf, with a processor 210 and memory 212 mounted on each message processor 202, 204, 206, and 208. Interconnect 214 may be any suitable communications medium for connecting message processors 202, 204, 206, and 208 together and allowing communications between the message processors. In one example, each message processor 202, 204, 206, and 208 may include a backplane connector, and interconnect 214 may be a backplane bus, such as a PCI or PCIe bus that physically connects message processors 202, 204, 206, and 208 together.

Message processors 202, 204, 206, and 208 may each include software, firmware, and/or hardware for performing particular functions relating to the processing and routing of Diameter signaling messages. In the illustrated example, message processors 202 and 204 each perform Diameter connection and routing functions. Accordingly, message processors 202 and 204 each include software, hardware, and/or firmware that implements a Diameter connection layer (DCL) 216 for initiating and maintaining Diameter connections with external nodes and a Diameter routing layer (DRL) 218 for routing Diameter signaling messages based on Diameter level information in the messages.

In the illustrated example, message processor 202 handles traffic to and from a home network and message processor 204 handles traffic to and from a foreign or interconnect network. Thus, message processor 204 may be configured to identify Diameter signaling messages from the foreign or interconnect network that contain MME identification information and that require MME authentication processing as described herein.

Message processors 206 and 208 each include MME authentication application 220 and AIR/ULR mapping database 222. MME authentication application 220 performs the functions described herein for authenticating the MME in AIR and ULR messages. AIR/ULR mapping database 222 stores records that are usable to map MME and subscriber information in AIR messages to MME and subscriber information in ULR messages.

As stated above, in the architecture illustrated in FIG. 2, message processor 204 is configured to send traffic to and receive traffic from a foreign network or an interconnect network, and message processor 202 is configured to send traffic to and receive traffic from a home network. Accordingly, when a subscriber is roaming in a foreign network, message processor 204 may receive messages from the foreign network, either directly from the foreign network or from an interconnect network that connects DEA 200 to the foreign network. When message processor 204 receives an authentication information request message, the message will be passed up the Diameter stack to Diameter routing layer 218. Diameter routing layer 218 may identify the message as an AIR message and determine that the message requires application processing by one of message processors 206 and 208. DRL 218 may then forward the AIR message to one of message processors 206 and 208 for MME authentication processing. If message processors 206 and 208 are identically provisioned, message processor selection for application processing of the AIR message may be performed using a load sharing algorithm, such as a round robin load sharing algorithm. The receiving message processor 206 or 208 may pass the message to MME authentication application 220. MME authentication application 220 may perform lookup in database 222 to determine whether a record exists for the IMSI in the message and, if a record exists, update the VPLMN ID in the record with the VPLMN ID from the AIR message, set the AIR flag in the record to indicate receipt of the AIR message, and set the ULR flag to a value indicating that a ULR message has not been received. After accessing database 222 and updating the record, the message processor that receives the AIR message may forward the AIR message to egress message processor 202. Egress message processor 202 may forward the message to the HSS in the subscriber's home network.

If the receiving message processor 206 or 208 does not locate a record in database 222 for the IMSI in the received AIR message, MME authentication application 220 may create a new record in the database for the AIR message. The new record may store the IMSI and the VPLMN ID extracted from the AIR message. The record may also include the AIR flag set to a value indicating that the AIR message has been received and a ULR flag set to a value indicating that a ULR message has not been received.

When a Diameter ULR message from a foreign or interconnect network is received by message processor 204, the ULR message may likewise be passed up the Diameter stack to Diameter routing layer 218. Diameter routing layer 218 may identify the message as a ULR message and forward the message to one of message processors 206 or 208. If message processors 206 and 208 have synchronized AIR/ULR mapping databases, then the ULR message can be forwarded to either of message processors 206 or 208, e.g., using a load sharing algorithm. If message processors 206 and 208 do not contain synchronized AIR/ULR mapping databases, then DRL 218 may forward the received ULR message to the message processor to which the corresponding AIR message was forwarded. Such forwarding may be effected either by maintaining state information for the AIR message on message processor 204 or by provisioning message processors 206 and 208 to handle specific and different ranges of IMSIs.

When message processor 206 or 208 receives the ULR message, the receiving message processor passes the message to MME authentication application 220. MME authentication application 220 performs a lookup in AIR/ULR mapping database 222 to determine whether a record exists for the IMSI and whether the VPLMN ID in the ULR message matches the VPLMN ID of record for the subscriber. If the VPLMN IDs match, MME authentication application 220 updates the MME identifier of the record with the origin-host received in the incoming ULR. If the VPLMN IDs match, the message processor 206 or 208 forwards the ULR message to egress message processor 202, and egress message processor 202 forwards the message to the HSS in the subscriber's home network. If the VPLMN IDs do not match, the receiving message processor 206 or 208 may prevent forwarding of the ULR message to egress message processor 202 and may instead forward the message to an analytics platform for fraud detection processing.

If message processor 202 receives an AIA message, message processor 202 forwards the AIA message to one of message processors 206 or 208. If the AIR/ULR mapping databases on message processors 206 and 208 are synchronized, the receiving message processor 204 may forward the AIA message to the message processor 206 or 208 that received the corresponding AIR message. If the AIR/ULR mapping databases on message processors 206 and 208 are not synchronized, message processor 202 may forward the AIA message to the message processor 206 or 208 that received the AIR message.

Once the AIA message is forwarded to one of message processors 206 and 208, the receiving message processor 206 or 208 passes the message to MME authentication application 220. MME authentication application 220 performs a lookup in database 222 to locate a record corresponding to the AIA message. If the record is located, message processor 216 may start the record expiry timer and forward the AIA message to egress message processor 204. Egress message processor 204 may forward the AIA message to the destination address specified in the AIA message, which should be the MME where the subscriber is currently attached. If a record is not located in database 222, MME authentication application 220 may likewise forward the AIA message to egress message processor 204, which forwards the AIA message to the MME where the subscriber is currently registered.

CLR messages are sent from the HSS to an MME where a subscriber is currently registered to delete a subscriber registration when the HSS learns that the subscriber has been validly registered with a new MME. Accordingly, if DEA 200 receives a CLR message from the home network, message processor 202 may forward the CLR message to one of message processors 206 or 208. If message processors 206 and 208 contain synchronized AIR/ULR mapping databases, message processor 202 may forward the CLR message to either of messages processors 206 or 208, where the message processor 206 or 208 is selected using a load sharing algorithm. If messages processors 206 and 208 do not contain synchronized AIR/ULR mapping databases 218, message processor 204 may forward the CLR message to the message processor to which the previous AIR, AIA, and ULR messages were forwarded.

After receiving the CLR message, the receiving message processor 206 or 208 may access its respective database 222 to locate a record corresponding to the IMSI in the CLR message. If the receiving message processor 206 or 208 locates a record in database 222, the receiving message processor 206 or 208 may delete the corresponding record with MME Identifier matching the Destination-Host of the CLR message and forward the CLR message to egress message processor 204. Egress message processor 202 may forward the CLR message to the MME. If the receiving message processor 206 or 208 does not locate a record corresponding to the IMSI in database 222, the receiving message processor may likewise forward the CLR message to message processor 202, which forwards the CLR message to the MME. Alternatively, because no record exists for the CLR message in database 222, MME authentication application 220 may prevent forwarding of the CLR message to the MME, mark the message as suspicious, and forward the CLR message to a fraud analytics platform.

Figure 3A:
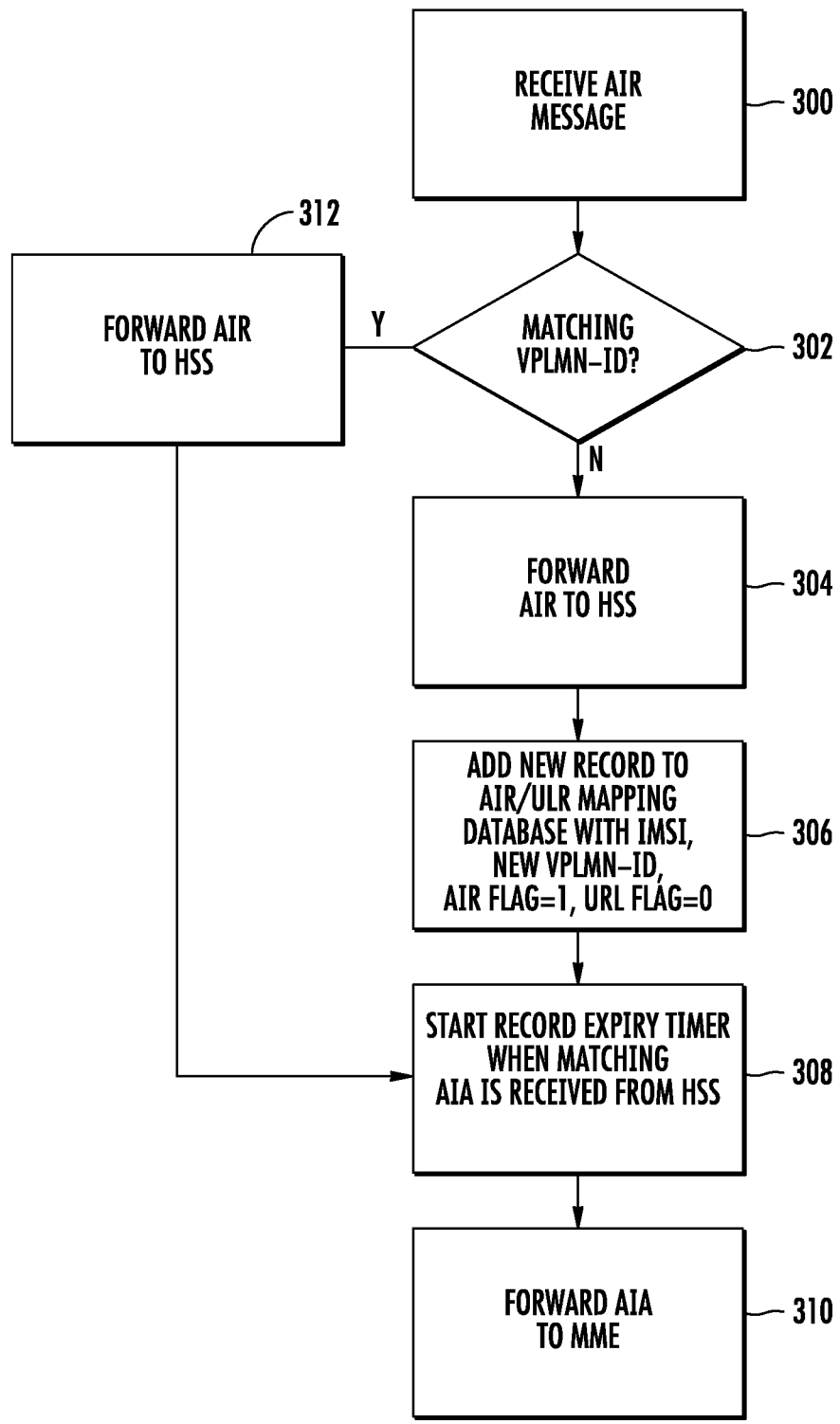
FIG. 3A is a flow chart illustrating an exemplary process performed by a DEA in processing an AIR message for MME authentication to reduce fraud in update location transactions.

FIGS. 3A-3E illustrate exemplary methods for processing messages relating to outbound roaming subscribers and protecting against roaming fraud. FIG. 3A illustrates an exemplary process performed for received AIR and AIA messages where a matching IMSI exists in mapping database 222. Referring to FIG. 3A, in step 300, an AIR message is received. In step 302, it is determined whether the AIR message includes a matching VPLMN ID. This step may be performed by MME authentication application 220 using database 222. Determining whether a matching VPLMN ID exists may include extracting an IMSI from the AIR message, using the IMSI to perform a lookup for a record corresponding to the IMSI in database 318, extracting the VPLMN ID from the record for the IMSI, and comparing the VPLMN ID extracted from the record to the VPLMN ID in the received AIR message. If the VPLMN ID in the record does not match the VPLMN ID in the AIR message, control proceeds to step 304 where the AIR message is forwarded to the HSS. In step 306, a new record is added to AIR/ULR mapping database 222. The new record may include, for the previously stored IMSI, a new VPLMN ID extracted from the AIR message, an AIR flag being set to 1, indicating that the AIR message has been received, and ULR flag set to 0, meaning that a ULR for the particular VPLMN ID has not been received.

In step 308, a record expiry timer is started when a matching AIA message is received from the HSS. The AIA message indicates that the AIR message was successfully processed by the HSS. In step 310, the AIA message is forwarded to the MME that sent the AIR message.

If, in step 302 the VPLMN ID in the received AIR message matches the VPLMN ID in the corresponding record in database 222, control proceeds to step 312 where the AIR message is forwarded to the HSS. Control then proceeds to step 308 where the record expiry timer is started when a corresponding AIA is received from the HSS. In step 310, the AIA message is forwarded to the MME.

Figure 3B:
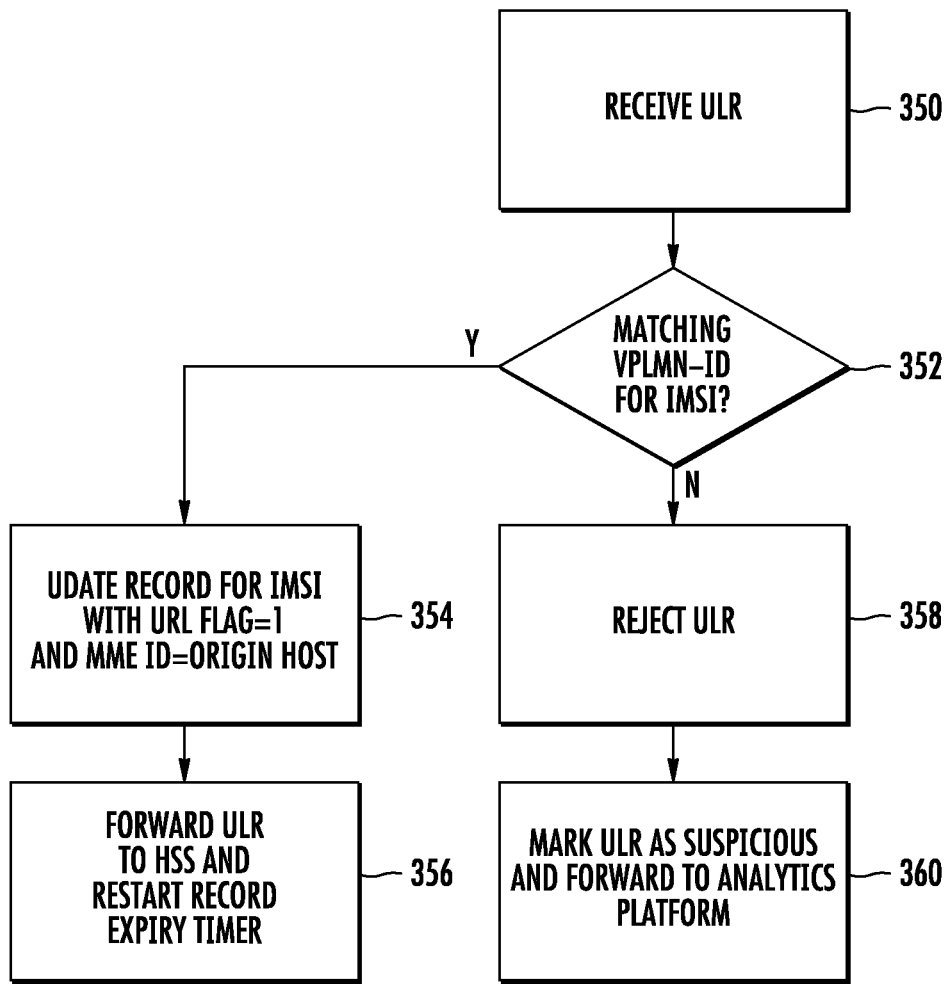
FIG. 3B is a flow chart illustrating an exemplary process performed by a DEA in processing a ULR message with a matching IMSI for MME authentication to reduce fraud in update location transactions.

FIG. 3B illustrates exemplary steps performed by MME authentication application 220 for processing a ULR message when the ULR message contains an IMSI that is present in database 222. Referring to FIG. 3B, in step 350, the ULR message is received. The ULR message may originate from a legitimate MME in a network where a subscriber is roaming or from an attacker. In step 352, it is determined whether the VPLMN ID extracted from the ULR message matches the VPLMN ID stored for the IMSI in Diameter AIR/ULR mapping database 222. Step 352 may be performed by a MME application 220 using database 222. If a VPLMN ID extracted from a ULR message matches the VPLMN ID in the database record, control proceeds to step 354 where the record for the IMSI is updated to set the ULR flag to 1, indicating the receipt of a ULR message, and the MME identifier is set to the Origin-Host parameter received in the ULR message. Control then proceeds to step 356 where the ULR message is forwarded to the HSS, and the record expiry timer for the record is reset.

Returning to step 352, if the VPLMN ID in the ULR message does not match the VPLMN ID stored in database 222 for the IMSI, the message is potentially from an attacker. Accordingly, in step 358, the ULR is rejected, i.e., prevented from being forwarded to the home HSS. In step 360, the ULR message is marked as suspicious and forwarded to an analytics platform. The analytics platform may notify the network operator and/or perform other actions associated with fraud detection and prevention.

Figure 3C:
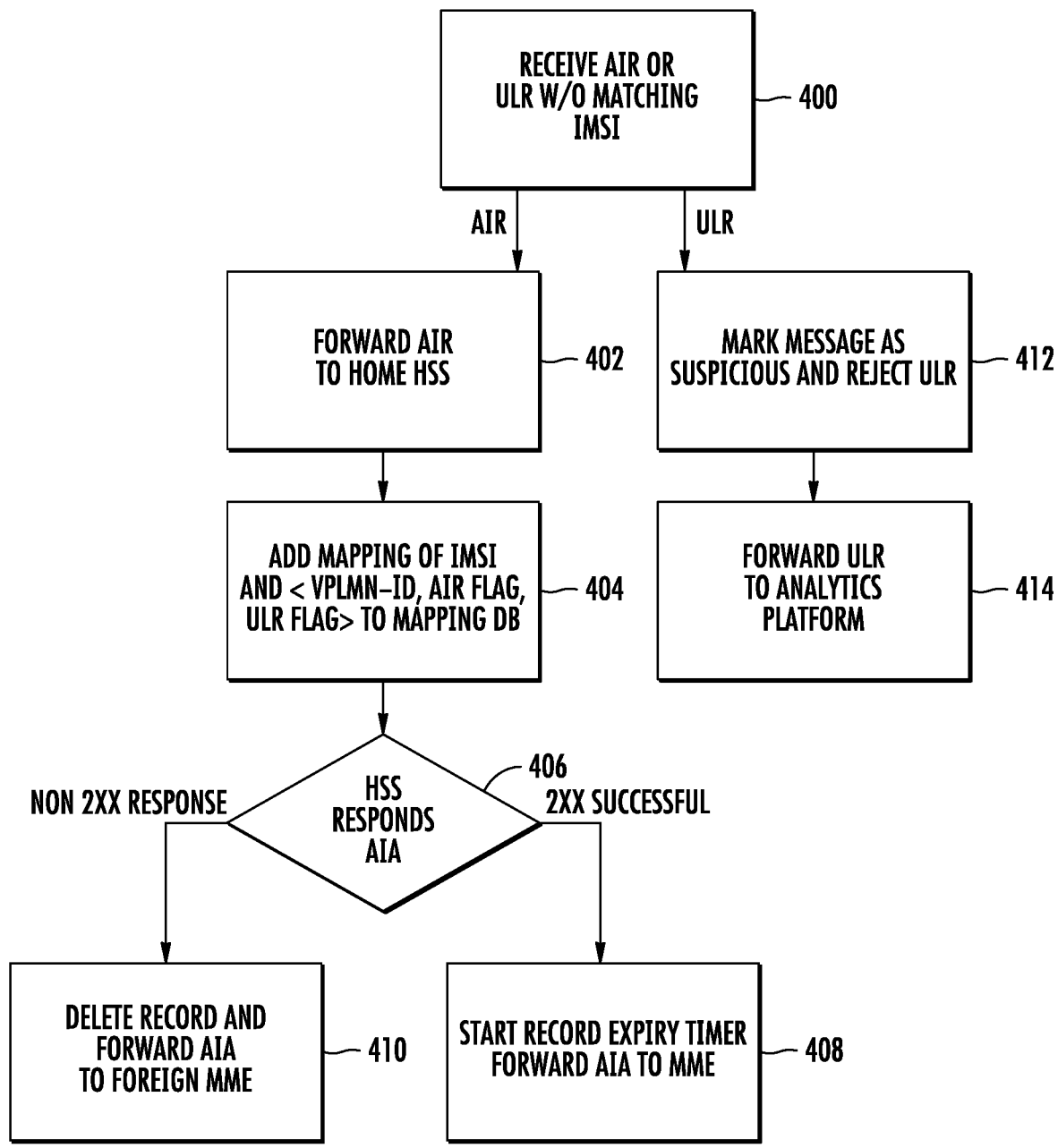
FIG. 3C is a flow chart illustrating an exemplary process performed by a DEA in processing an AIR or ULR message without a matching IMSI for MME authentication to reduce fraud and update location transactions.

FIG. 3C illustrates exemplary steps performed by MME authentication application 220 in processing a received AIR or ULR message without a matching IMSI (i.e. no record present for the IMSI in AIR/ULR mapping database 222). Referring to FIG. 3C, in step 400, an AIR or a ULR without a matching IMSI is received. Determining whether the message includes a matching IMSI may include extracting the IMSI from the message and performing a lookup in database 222 using the IMSI. If there is no matching record for the IMSI in database 222, the processing in FIG. 3C will occur.

Referring to the left hand branch in FIG. 3C, if the received message is an AIR message, control proceeds to step 402 where the AIR message is forwarded to the home HSS. In step 404, a record mapping the IMSI extracted from the AIR message to the VPLMN ID and including an AIR flag and a ULR flag is added to database 222. In step 406, the HSS responds with an AIA message. If the response indicates that the AIR procedure is successful, control proceeds to step 408 where the record expiry timer is started, and the AIA message is forwarded to the foreign MME. If the response indicates that the AIR procedure was not successful, control proceeds to step 410 where the record is deleted from database 222, and the AIA message is forwarded to the foreign MME.

Returning to step 400, if the received message is a ULR and there is no matching IMSI, control proceeds to step 412 where the message is marked as suspicious and rejected. Rejecting the ULR includes blocking the ULR from being forwarded to the HSS. In step 414, the ULR is forwarded to an analytics platform where fraud detection and/or prevention processing is performed. As stated above, such processing can include notifying the network operator and generating statistics of ULR messages identified as fraudulent.

Figure 3D:
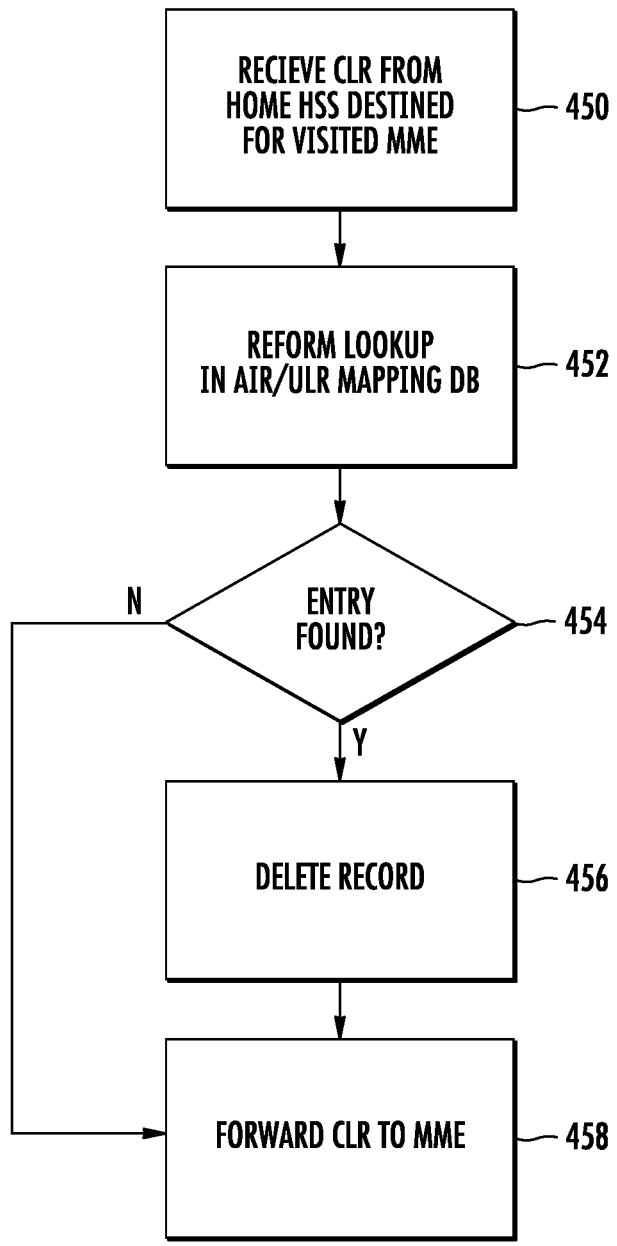
FIG. 3D is a flow chart illustrating an exemplary process performed by a DEA in processing a cancel location request (CLR) message for MME authentication to reduce fraud in update location transactions.

FIG. 3D illustrates exemplary processing that may be performed by MME authentication application 220 when a cancel location request message is received from the home HSS. Referring to FIG. 3D, in step 450, a CLR message from a home HSS is received. The CLR message may be destined for a visited MME where a UE was formerly registered. In step 452, a lookup is performed in AIR/ULR mapping database 222. The lookup may be performed using the destination host in the CLR and comparing the destination host with the MME identifiers recorded for authenticated ULR messages. In step 454, it is determined whether an entry or record was found in database 222 for which the destination host of the CLR message matches the MME identifier of the record, the record corresponding to the CLR message is deleted (step 456). In step 458, the CLR is forwarded to the MME.

In step 454, if no entry is found in database 222, control proceeds to step 458 where the CLR message is forwarded to the MME.

Figure 3E:
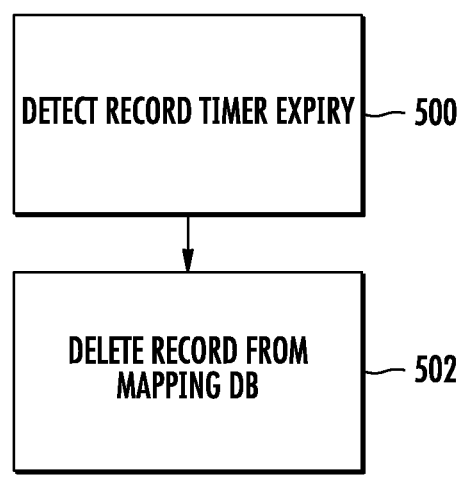
FIG. 3E is a flow chart illustrating an exemplary process performed by a DEA in deleting a mapping database entry for MME authentication to reduce fraud in update location transactions.

FIG. 3E illustrates exemplary steps that may be performed by application 220 in response to expiry of a record timer. Referring to FIG. 3E, in step 500, a record timer expiry is detected. In step 502, the record is deleted from mapping database 222.

Figure 4:
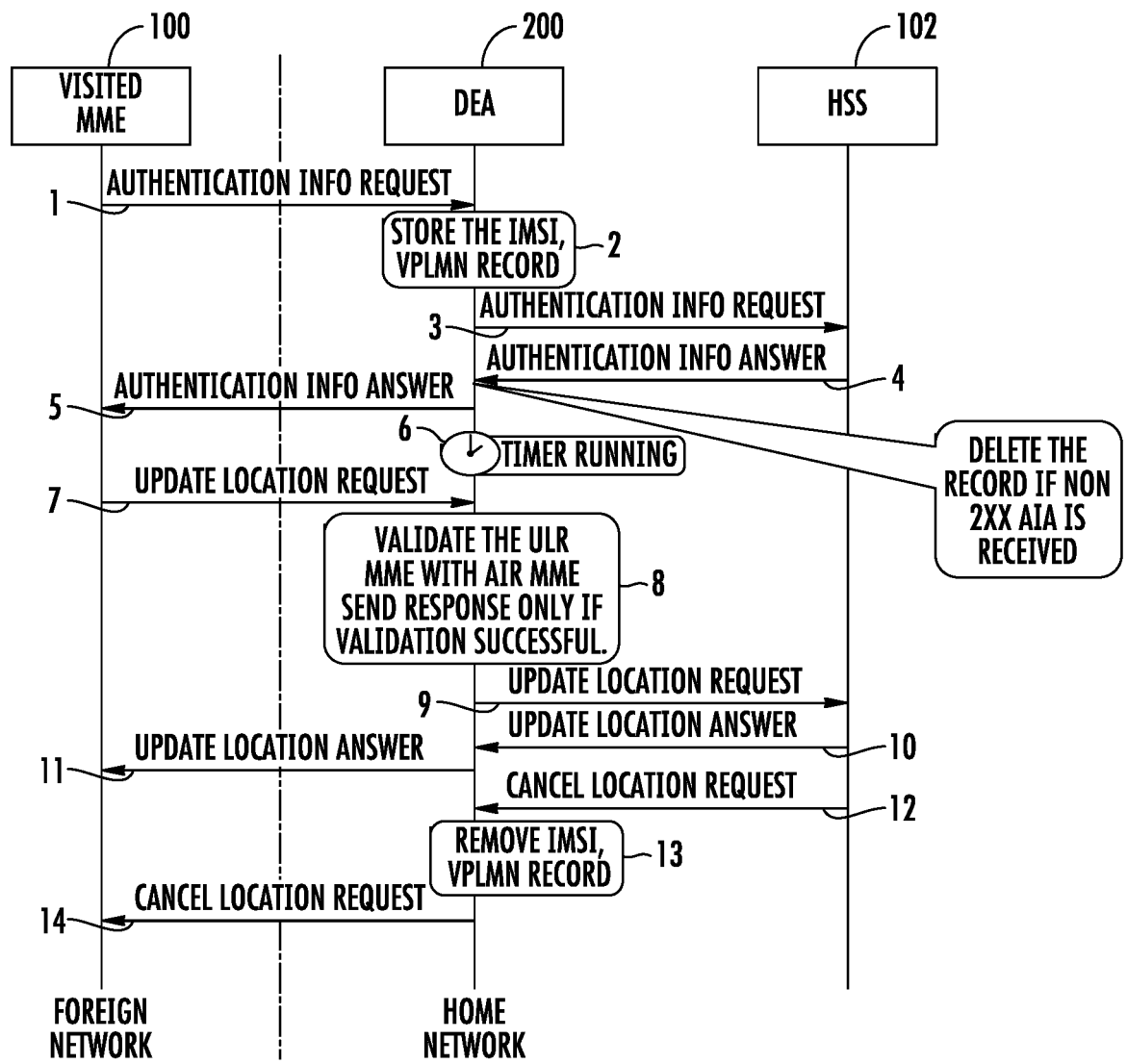
FIG. 4 is a message flow diagram illustrating exemplary messaging for MME authentication to reduce fraud in update location transactions.

FIG. 4 is an updated call flow illustrating exemplary messages exchanged with DEA 200 in identifying and processing messages relating to roaming subscribers. Referring to FIG. 4, in line 1, visited MME 100 sends an AIR message to DEA 200. The AIR message may be generated by a legitimate MME 100 in response to a UE attachment to the network.

Alternatively, the AIR message may be a fraudulent message generated by an attacker masquerading as valid MME. In line 2 of the message flow diagram, DEA 200 stores the IMSI and VPLMN ID record in database 222. In line 3, DEA 200 forwards the AIR message to HSS 102.

HSS 102, in response to receiving the AIR message, in line 4, generates an AIA message. If the AIA message indicates that the AIR transaction was unsuccessful, the record created in step 2 is deleted. If the AIA message indicates that the AIR transaction is successful, the record is maintained in database 222. In line 5, the AIA message is forwarded to MME 100. In line 6, after receiving a successful AIA message, DEA 200 starts the expiry timer for the record.

In line 7 of the message flow diagram, visited MME 100 sends a ULR message to DEA 200. In line 8, DEA 200 validates the ULR MME with the AIR MME. If validation is successful, the ULR is forwarded to HSS 102 in line 9. If the validation is not successful, the ULR message is not forwarded to HSS 102 and may instead be diverted to an analytics platform for fraud processing.

Assuming a valid ULR message, the ULR is forwarded to HSS 102. In line 10, HSS 102 sends a ULA message to DEA 200. DEA 200 sends the ULA message to MME 100 in line 11.

In line 12, HSS 102 sends a cancel location request to DEA 200. In line 13, DEA 200 removes the IMSI, VPLMN ID record from database 222. In line 14, DEA 200 sends the cancel location request to visited MME 100.

Advantages of the subject matter described herein include the ability to be deployed and operational at a Diameter signaling router (DSR) or Diameter routing agent deployed as a network operator's Diameter edge agent. Deploying the fraud detection method at the DEA reduces the need for a dedicated Diameter firewall node in an operator's network. The fraud detection methods described herein can be deployed by a mobile network operator (MNO) as well as an interconnect operator (IPX operator). An interconnect operator can add and perform the MME authentication processing described herein on behalf of all MNOs connected to interconnect operator. Thus, an interconnect operator utilizing the subject matter described herein can correlate AIR and ULR messages for plural MNOs and protect the HSS(s) of each MNO.

An additional advantage of deploying the subject matter described herein at a DEA, rather than an end node, such as an HSS, is that messaging between the DEA and the HSS may be reduced. For example, if authentication of a ULR is performed by the HSS, authentication messaging between the DEA and the HSS may be required for each ULR message received before determining whether the ULR message can be forwarded to the HSS. Such additional authentication messaging can result in unnecessary traffic in an operator's network. The subject matter described herein avoids such additional messaging by performing MME authentication at the DSR or DEA using an authentication database local to the DSR or DEA.

A DEA configured to perform MME authentication as described herein improves the technological field of computer network security by reducing the likelihood of fraud and other types of signaling attacks on computer networks. In addition, the subject matter described herein improves the area of communications network efficiency by reducing the amount of signaling required to perform MME authentication by caching information from AIR messages at a DEA, the need for signaling back and forth between the DEA and the HSS for authentication is reduced.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for authenticating a mobility management entity (MME) for outbound roaming subscribers, the method comprising:
    maintaining a Diameter authentication information request/update location request (AIR/ULR) mapping database at a Diameter edge agent (DEA), wherein the AIR/VLR mapping database stores mappings between visited public land mobile network identifiers (VPLMN IDs) from Diameter AIR messages and international mobile subscriber identities (IMSIs) obtained from the AIR messages;
    receiving, at the DEA, a first Diameter AIR message for a subscriber;
    determining, by the DEA, that the first Diameter AIR message includes a first IMSI not of record in the AIR/ULR mapping database at the DEA;
    recording, for the subscriber, a VPLMN ID extracted from the first Diameter AIR message in the Diameter AIR/ULR mapping database at the DEA, wherein recording the VPLMN ID extracted from the first Diameter AIR message in the Diameter AIR/ULR mapping database at the DEA includes creating a new record in the Diameter AIR/ULR mapping database at the DEA for the first IMSI and the VPLMN ID;
    receiving, at the DEA, a first Diameter ULR message and reading a VPLMN ID in the first Diameter ULR message;
    determining that the VPLMN ID read from the first Diameter ULR message does not match the VPLMN ID extracted from the first Diameter AIR message and recorded for the subscriber in the Diameter AIR/ULR mapping database at the DEA; and
    in response to determining that the VPLMN ID read from the first Diameter ULR message does not match the VPLMN ID extracted from the first Diameter AIR message and recorded for the subscriber in the Diameter AIR/ULR mapping database at the DEA, rejecting the first Diameter ULR message.

2. The method of claim 1 wherein the DEA comprises a Diameter routing agent (DRA) for functioning at an edge of a home network for the subscriber.

3. The method of claim 1 comprising receiving a second Diameter AIR message including a second IMSI that is of record in the Diameter AIR/ULR mapping database at the DEA and updating, in the Diameter AIR/ULR mapping database at the DEA, a record corresponding to the second IMSI by storing the VPLMN ID from the second Diameter AIR message in the record.

4. The method of claim 1 comprising:
    forwarding the first Diameter AIR message to a home subscriber server (HSS);
    receiving a Diameter authentication information answer (AIA) message with a successful result code from the HSS; and
    starting a record expiry timer in response to receiving the Diameter AIA message from the HSS.

5. The method of claim 4 comprising, in response to the record expiry timer reaching an expiration value, deleting the record from the Diameter AIR/ULR mapping database at the DEA.

6. The method of claim 1 comprising receiving a second Diameter ULR message including a VPLMN ID that matches the VPLMN ID recorded for the subscriber in the Diameter AIR/ULR mapping database.

7. The method of claim 6 comprising forwarding the second Diameter ULR message to a home subscriber server (HSS).

8. The method of claim 7 comprising updating the record in the Diameter AIR/ULR mapping database at the DEA to indicate receipt of the second Diameter ULR message and storing, in the record, an origin host parameter from the second Diameter ULR message as an MME identifier.

9. The method of claim 1 comprising, in response to determining that the VPLMN ID in the first ULR message does not match the VPLMN ID recorded for the subscriber in the Diameter AIR/ULR mapping database, marking the first Diameter ULR message as suspicious.

10. A system for authenticating a mobility management entity (MME) for outbound roaming subscribers, the system comprising:
  a memory in connection with at least one processor, wherein the memory comprises:
  a Diameter edge agent (DEA);
  a Diameter authentication information request/update location request (AIR/ULR) mapping database local to the DEA for storing records for authenticating MMEs, wherein the AIR/VLR mapping database stores mappings between visited public land mobile network identifiers (VPLMN IDs) from Diameter AIR messages and international mobile subscriber identities (IMSIs) obtained from the AIR messages; and
  an MME authentication application local to the DEA and implemented using the at least one processor for receiving a first Diameter AIR message for a subscriber, determining that the first Diameter AIR message includes a first IMSI not of record in the AIR/ULR mapping database at the DEA, recording, for the subscriber, a VPLMN ID extracted from the first Diameter AIR message in the AIR/ULR mapping database at the DEA, wherein recording the VPLMN ID extracted from the first Diameter AIR message in the Diameter AIR/ULR mapping database at the DEA includes creating a new record in the Diameter AIR/ULR mapping database at the DEA for the first IMSI and the VPLMN ID, receiving a first Diameter ULR message and reading a VPLMN ID in the first Diameter ULR message, determining that the VPLMN ID read from the first Diameter ULR message does not match the VPLMN ID extracted from the first Diameter AIR message and recorded for the subscriber in the Diameter AIR/ULR mapping database at the DEA, and, in response to determining that the VPLMN ID read from the first ULR message does not match the VPLMN ID extracted from the first Diameter AIR message and recorded for the subscriber in the Diameter AIR/ULR mapping database at the DEA, rejecting the first Diameter ULR message.

11. The system of claim 10 wherein the DEA comprises a Diameter routing agent (DRA) for functioning at an edge of a home network for the subscriber.

12. The system of claim 10 wherein the MME authentication application is configured to receive a second Diameter AIR message including a second IMSI that is of record in the Diameter AIR/ULR mapping database at the DEA and to update, in the Diameter AIR/ULR mapping database at the DEA, a record corresponding to the second IMSI by storing the VPLMN ID from the second Diameter AIR message in the record.

13. The system of claim 10 wherein the MME authentication application is configured to:
  forward the first Diameter AIR message to a home subscriber server (HSS);
  receive a Diameter authentication information answer (AIA) message with a successful result code from the HSS; and
  start a record expiry timer in response to receiving the Diameter AIA message from the HSS.

14. The system of claim 13 wherein the MME authentication application is configured to, in response to the record expiry timer reaching an expiration value, delete the record from the Diameter AIR/ULR mapping database at the DEA.

15. The system of claim 10 wherein the MME authentication application is configured to receive a second Diameter ULR message including a VPLMN ID that matches the VPLMN ID recorded for the subscriber and to forward the second Diameter ULR message to a home subscriber server (HSS).

16. The system of claim 15 wherein the MME authentication application is configured to update the record in the AIR/ULR mapping database at the DEA to indicate receipt of the second Diameter ULR message and to store, in the record, an origin host parameter from the second Diameter ULR message as an MME identifier.

17. The system of claim 10 wherein the MME authentication application is configured to, in response to determining that the VPLMN ID in the first Diameter ULR message does not match the VPLMN ID recorded for the subscriber in the Diameter AIR/ULR mapping database, mark the first Diameter ULR message as suspicious.

18. A non-transitory computer readable medium having stored thereon executable instructions that when executed by the processor of a computer controls the computer to perform steps comprising:
  maintaining a Diameter authentication information request/update location request (AIR/ULR) mapping database at a Diameter edge agent (DEA), wherein the AIR/VLR mapping database stores mappings between visited public land mobile network identifiers (VPLMN IDs) from Diameter AIR messages and international mobile subscriber identities (IMSIs) obtained from the AIR messages;
  receiving, at the DEA, a Diameter AIR message for a subscriber;
  determining, by the DEA, that the Diameter AIR message includes an IMSI not of record in the AIR/ULR mapping database at the DEA;
  recording, for the subscriber, a VPLMN ID extracted from the Diameter AIR message in the Diameter AIR/ULR mapping database at the DEA, wherein recording the VPLMN ID extracted from the Diameter AIR message in the Diameter AIR/ULR mapping database at the DEA includes creating a new record in the Diameter AIR/ULR mapping database at the DEA for the IMSI and the VPLMN ID;
  receiving, at the DEA, a first Diameter ULR message and reading a VPLMN ID in the first Diameter ULR message;
  determining that the VPLMN ID read from the first Diameter ULR message does not match the VPLMN ID extracted from the Diameter AIR message and recorded for the subscriber in the Diameter AIR/ULR mapping database at the DEA; and in response to determining that the VPLMN ID read from the first Diameter ULR message does not match the VPLMN ID extracted from the Diameter AIR message and recorded for the subscriber in the Diameter AIR/ULR mapping database at the DEA, rejecting the first Diameter ULR message.

\* \* \* \* \*

UNITED STATES PATENT AND TRADEMARK OFFICE
CERTIFICATE OF CORRECTION

PATENT NO. : 10,616,200 B2
APPLICATION NO. : 15/666300
DATED : April 7, 2020
INVENTOR(S) : Kumar et al.

It is certified that error appears in the above-identified patent and that said Letters Patent is hereby corrected as shown below:

On the Title Page

Page 3, Item (56) Column 2, Line 11:
Replace "Digitial" with -- Digital --.

Signed and Sealed this
Seventeenth Day of May, 2022

Katherine Kelly Vidal
*Director of the United States Patent and Trademark Office*